May 10, 1966  J. J. BYRNES ETAL  3,250,349
DISC BRAKE
Filed March 20, 1964  2 Sheets-Sheet 1
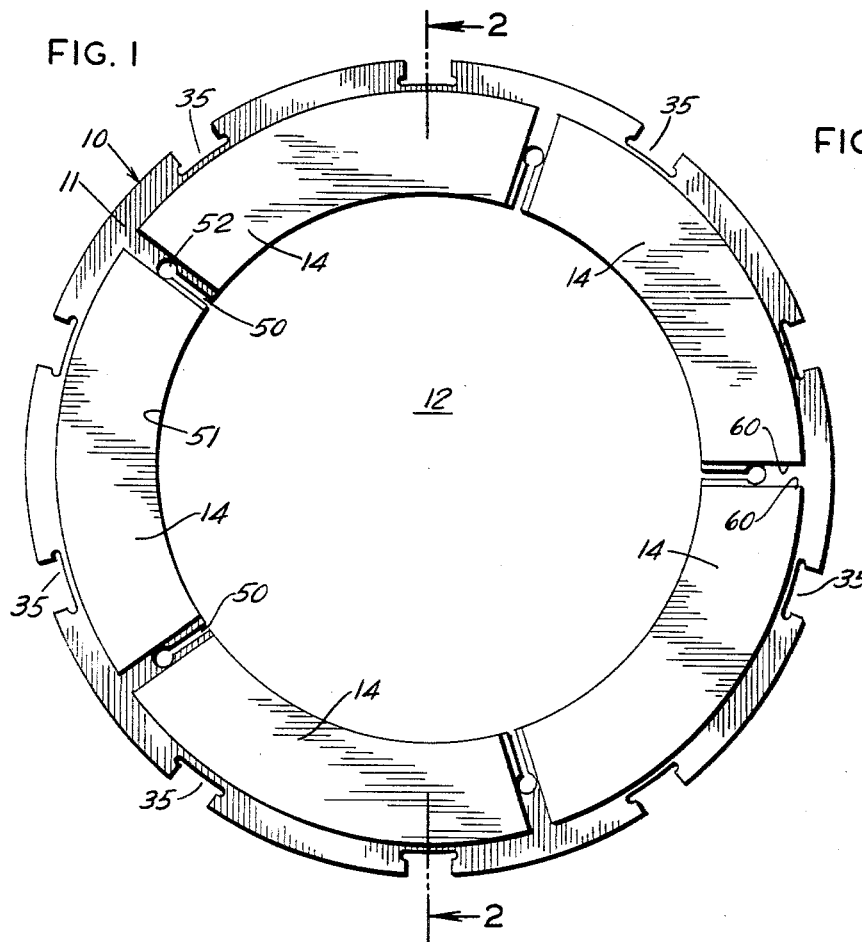
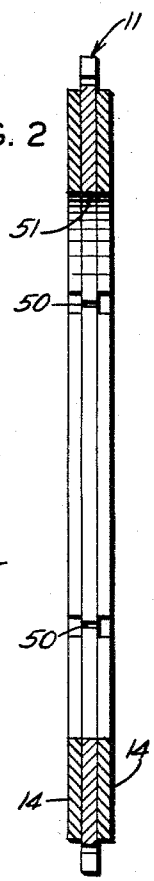
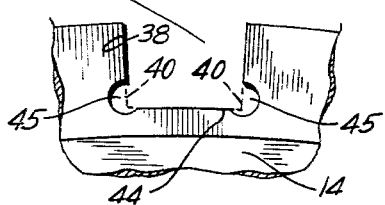
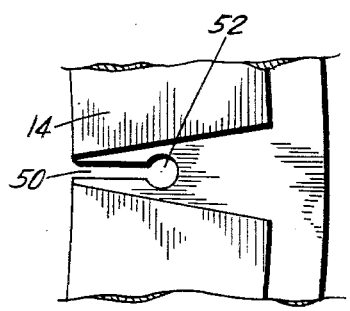
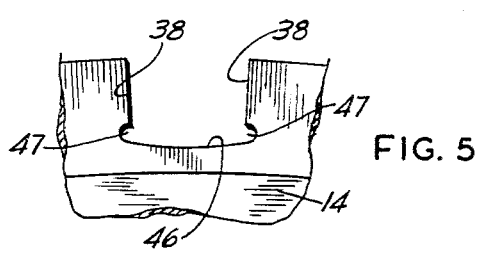
INVENTORS.
JOHN J. BYRNES
FRANK E. TAYLER, JR.
BY
Wallace Kinzer and Dorn
ATTORNEYS May 10, 1966 J. J. BYRNES ETAL 3,250,349
DISC BRAKE
Filed March 20, 1964 2 Sheets-Sheet 2
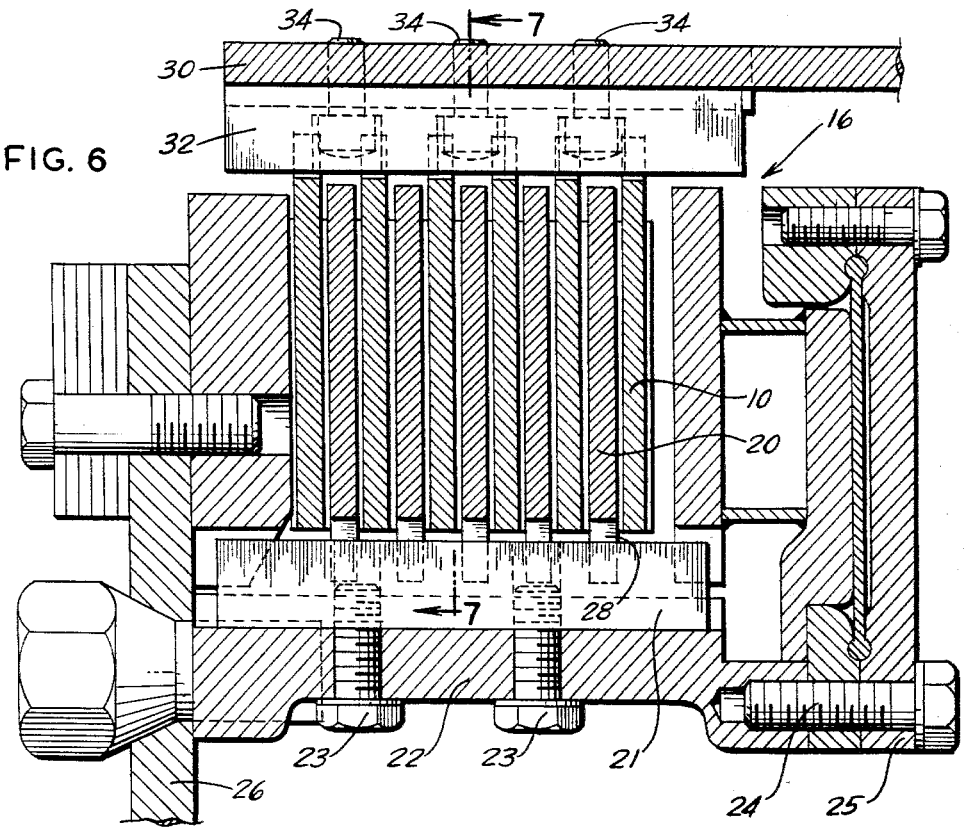
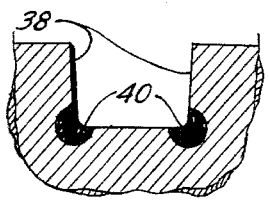
FIG. 8
PRIOR ART
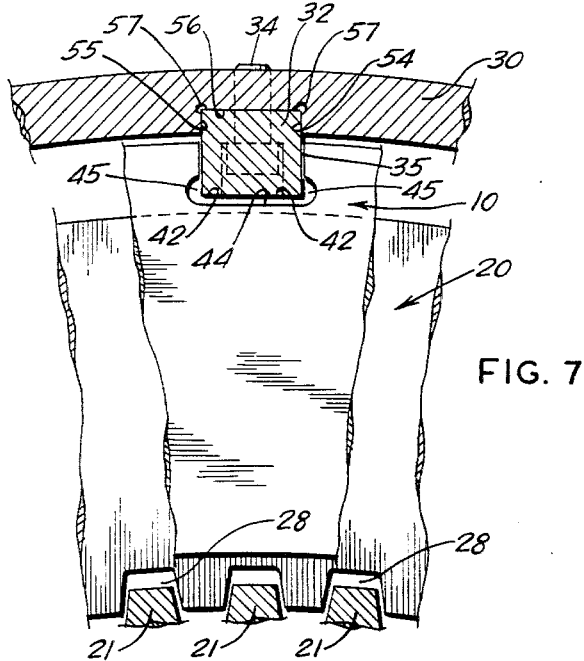
FIG. 7
INVENTORS.
JOHN J. BYRNES
FRANK E. TAYLER, JR.
BY Wallace Kinzer and Dorr
ATTORNEYS

United States Patent Office 3,250,349
Patented May 10, 1966

3,250,349
DISC BRAKE
John J. Byrnes, Birmingham, and Frank E. Tayler, Jr., Grosse Point Farms, Mich., assignors to American Brake Shoe Company, New York, N.Y., a corporation of Delaware
Filed Mar. 20, 1964, Ser. No. 353,475
3 Claims. (Cl. 188—218)

This invention relates to improvements in friction couple discs, and more particularly to improvements in friction couple discs commonly employed in disc brake mechanisms, clutch mechanisms, transmission mechanisms and the like.

This invention is directed to the alleviation of the problem of fractures in friction couple discs caused by a failure of the metal about a notch adapted to receive a key-type connection. The term "friction couple disc" as employed herein is meant to cover either of two discs or plates which are brought together and into frictional engagement to constitute a couple whether that couple is used in a clutch, transmission or brake mechanism. In many applications, friction couple discs are attached to a supporting shaft by means of a key or keys disposed in a mating notch in the friction couple disc; and, in other applications friction couple discs have a notch or notches in the outer periphery surfaces of the disc to receive appropriate keys such as the driving keys of an outer revolving mechanism. When the friction couple discs are being subjected to a load, the engagement of a key with the bottom corners of a notch in the friction disc causes, insofar as now ascertainable, the development of localized areas or lines of stress along lines extending arcuately from a corner of the notch. These lines of localized stresses extending arcuately from the corner of the notch are designated by the term "stress risers." For instance, fractures in brake discs have occurred along stress risers lines emanating from the notched corners of the brake disc. Accordingly, an object of the present invention is to eliminate such failures and fractures in friction couple discs by configuring the notches in the discs so as to prevent the bottom corner of the mating keys from engaging the side walls of the notch in the disc.

According to another object of the invention, friction discs are formed with undercuts in the bottom corners of the notches so that the bottom corners of associated mating keys do not contact the side walls of the notches, but are disposed to be positioned at the undercut in the notch.

Another object of the invention is the forming of generally circular holes at the bottom corners of the notches in a friction ocuple disc to receive the bottom corners of a mating driving key disposed in the notch and in engagement with the side walls of the notch.

A further object of the invention is achieving more uniform heat treatment of the sides of the notches by forming undercuts at the bottom corner of the notches to retard heat flow during flame or induction heating of the notches into a heat sink area about the corners of the notches of the disc.

A specific object of the invention is the elimination of fractures in brake discs along a stress riser line by forming clearance openings in the bottom corners of the notches to prevent engagement with a driving key disposed in the notch to supply the driving force for the brake disc.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as designed by those skilled in the art without departing from the present invention and the purview of the appended claims.

In the drawings:

FIG. 1 is a plan view of a revolving brake disc according to the preferred embodiment of the invention;

FIG. 2 in a sectional view taken along the lines 2—2 of FIG. 1 in the direction of the arrows showing opposed friction surfaces on the brake disc;

FIG. 3 is an enlarged fragmentary view of a driving notch in a brake disc, according to the preferred embodiment of the invention;

FIG. 4 is an enlarged fragmentary view of a slot in a braking disc terminating in a circular hole;

FIG. 5 illustrates another embodiment of the invention wherein the bottom of a slot is formed with an arcuate surface;

FIG. 6 is a section view illustrating the brake disc employed in a disc brake assembly;

FIG. 7 is a sectional view taken along the lines 7—7 of FIG. 6 in the direction of the arrows showing a driving key inserted in a notch in a brake disc; and FIG. 8 is a view of a prior art notch.

The term "friction couple disc," as used herein, refers not only to a friction couple disc 10 of the type illustrated in FIG. 1, having an annular body portion 11 with a large central opening and arcuate friction surfaces 14 affixed to the disc, but also refers to the opposing plate or disc 20 which does not necessarily have special friction surfaces fixed to its sides. When a first friction couple disc 10 is in frictional engagement with an opposed friction couple disc 20, the discs constitute a frictional couple, in which the discs 10 and 20 are adapted to rotate together as the friction discs or plates of a clutch or transmission mechanism; or the discs constitute a friction couple in which one disc is rotatable and one is stationary, as in a disc brake mechanism.

For ease of illustration and discussion, there is shown in FIG. 6 a disc brake mechanism 16 employing friction couple discs 10 and 20. More specifically, six friction couple discs 10 are shown interspersed among five opposing discs 20.

As will be understood by those familiar with the art, the friction couple discs 10 are spaced from the opposing friction couple discs 20 for free rotation relative thereto when the brake mechanism is not being operated. However, when the brake mechanism is being operated, the revolving friction couple discs 10 and opposing discs 20 are moved axially relative to each other, to frictionally engage their respective side walls and thereby cause a frictional couple, which has a braking action, in the present instance.

Preferably, the friction couple discs 10 or 20 are made of metal from a forging, casting or cut metal plate. The opposing discs 20 do not have any friction elements bonded thereto, while the revolving discs 10 have frictional elements 14 bonded, sintered or otherwise secured to their sides.

In the disc brake mechanism shown in FIG. 6, the friction couple discs 20 are slidable axially on a series of trapezoidal-shaped splines 21 secured by threaded fasteners 23 to the periphery of a cylindrical axle housing hub 22. In turn, the axle housing hub 22 is secured by suitable threaded fasteners 24 to a pair of axle housing walls or flanges 25 and 26. The stationary friction couple discs 20 have at their lower peripheral edges a plurality of spaced, trapezoidal-shaped openings 28 in which are received the splines 21 so that the non-rotatable discs 20 will be held against rotation by the forces exerted thereon by the rotatable discs 10 during a braking action.

The axle hub 22 and opposed side walls 25 and 26 constitute an axle housing about which rotates a wheel (not shown) which has secured thereto a circular driving ring 30 which carries at spaced intervals a plurality of driving keys 32 secured to the driving ring 30 by a plurality of fasteners 34. The driving ring 30 and attached driving keys 32 rotate with the wheel (not shown) or rotating element and the revolvable friction discs 10 are revolved therewith due to the driving relationship between the driving keys 32 disposed in driving notches 35.

As apparent from FIGS. 6 and 7, each driving key 32 extends across all six of the rotatable friction discs 10 and each non-rotatable, friction disc 20 terminates beneath the rotating keys 32. The driving ring 30 for the disc brake mechanism 16 has ten spaced driving notches 35, as shown in the friction discs 10 in FIG. 1. As can be readily appreciated, the torque between a friction disc 10 and the driving keys 32 can be of a substantial magnitude. Past experience shows that after repetitive braking operations, fracturing and tearing of the side walls 38 of the notches 35 occurs in substantial numbers of friction discs 10.

Typically, a metal failure of the body 11 of a prior art friction disc started from a bottom corner 40 (shown in dotted lines in FIG. 3) and extended arcuately outward from the corner 40 as along a stress riser line. The notches 35 of prior art brake discs terminated in the substantially sharper or smaller radiused corners 40, FIG. 8. The relatively square bottom corners 42 of a mating driving key 32 apparently concentrated most of the shock load stresses at the corners 40 of the side walls 38 of the notches 35. Repetitive stressing at the corners 40 of prior art friction discs and the concentration of stresses along the "stress riser" lines appear to have caused fractures or cracks, particularly under the shock loading, at the corners 40 by the bottom corners 42 of the driving keys 32.

The present invention is directed to alleviation of the susceptibility of failures of a rotatable disc by affording a configuration to the notches 35 so as to prevent engagement of the walls 38 by the bottom corner 42 of a driving key 32. Preferably, generally circular openings 45 are provided at the juncture between the side walls 38 and a bottom wall 44. The circular openings 45 are formed at the bottom corners 40 of the notches 38 so that the bottom corners 42 of the mating driving key 32 are disposed to ride in the openings 45 as the side wall of a key 32 engages one of the side walls 38 of a notch 35. Since the openings 45 provide clearance for the bottom corners 42 of the driving key, the bottom corners 42 do not concentrate the shock load stresses on the walls 38 of the notches between the side walls 38 and the bottom wall 44.

As best seen in FIG. 7, the bottom surface of the driving key 32 does not usually engage the bottom wall 44 of a notch 35 but is usually slightly spaced therefrom. However, to make certain the driving key 32 does not engage its bottom corners 42 with the bottom wall 44 of a notch 35, the bottom wall 44 can be arcuately curved downward to form an arcuate bottom wall 46, FIG. 5. As seen in FIG. 5, the arcuate wall 46 terminates at the semi-circular shaped openings 47.

It will thus be observed that the openings 45, shown in FIG. 3, are more circular in shape than the openings 47 of FIG. 5. Similar clearance openings for the corners of the keys may be formed of other sizes and shapes and still be within the purview of the present invention.

The application of the brake mechanism causes the generation of considerable heat and thus expansion of the metal body 11 of the rotatable brake disc 10, and to accommodate expansion of the metal due to this heat, each of the brake discs 10 is provided with a series of expansion slots 50 extending radially from the inner circumferential edge 51 of the metal body 11 at the aperture 12.

The openings 52 are larger in radius than the width of the slot 50. In practice, the generally circular openings 45 and 52 are provided by drilling the metal body 11 of the brake disc 10. The expansion slots 50 are disposed in the space between adjacent end surfaces 60 of the five separate friction elements 14 on each side of the brake disc 10.

The present invention is also advantageous in that the side walls 38 of the notches 35 receive a more uniform heat treating and thus are less subject to peening. The smaller and sharper corners 40 of the prior art type of notch permitted the heat flow into the large heat sink area at the corner of the notches (shaded area of FIG. 8) and the undercut or back radius corners 45 of the present invention retard the heat flow during flame or induction heating of the side walls 38 into the large heat sink of the friction-faced area 14. Consequently, the hardening of the side walls 38 is more uniform. The flow of heat into the heat sink shown in FIG. 8 caused the forming of a less hard area at each of the more square-shaped corners 40 of prior art notches.

Thus, it will be seen that the development of stress risers, elimination of cracking or failures of the discs at key notches 35 and the peening of the side walls of the notches 35 are provided by the undercuts adjacent the bottom corners of a key adapted to be disposed in the notch.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A friction couple disc adapted to be frictionally engaged and to be interconnected by a key to another element said friction couple disc comprising an annular body member having surface walls on said annular body member at least one of which is for frictional engaging purposes, at least one notch seat means formed in said disc to receive the key for inter-connection to said another element, said notch seat means including a pair of spaced side walls extending into said peripheral walls on said annular body member, a bottom wall extending between said side walls, and clearance spaced defined by arcuate walls formed in said side walls at the juncture between said side walls and said bottom wall and extending into said side walls so as to be spaced circumferentially a greater distance than the adjacent side walls to prevent the engagement of a bottom corner of said key with said side wall.

2. In a friction disc adapted to be employed in a disc brake mechanism wherein a driving key is adapted to inter-connect the friction disc and a rotatable means carrying the driving key, said friction disc having metal plates with a large central aperture and having inner and outer peripheral surfaces, at least one notch formed in the peripheral surface of said friction disc to receive said driving key, said notch having spaced side walls extending to a peripheral surface, said side walls being spaced a predetermined circumferential distance from each other for driving engagement with said key, a bottom wall of concave configuration extending between said side walls, and curved walls extending from said bottom wall to said side walls, said curved walls being spaced a greater circumferential distance from one another than said predetermined distance so that the bottom corners of the driving key are disposed in spaced relationship to a curved wall and free of engagement of a side wall.

3. A friction couple disc adapted to be frictionally engaged and to be interconnected by a key to another element, said friction couple disc comprising an annular body member having surface walls on said annular body member at least one of which is for frictional engaging purposes, at least one notch seat means formed in said disc to receive a key for interconnection to said another element, said notch seat means including a pair of spaced generally radially extending side walls extending from a peripheral edge of said annular body member, a bottom wall spaced from said peripheral edge and extending between said side walls, said side walls being connected with opposite ends of said bottom wall by arcuate walls curving outwardly from said side walls in a circumferential direction and joining with said bottom wall so as to provide clearance spaces at the juncture between said side walls and opposite ends of said bottom wall to prevent the engagement of a bottom corner of a key with said side wall.

References Cited by the Examiner

UNITED STATES PATENTS

| | | | |
|---|---|---|---|
| 2,423,881 | 7/1947 | Du Bois | 188—218 X |
| 2,850,118 | 9/1958 | Byers | 188—218 X |
| 3,010,542 | 11/1961 | Graber | 188—72 |
| 3,094,194 | 6/1963 | Kershner | 188—218 X |

FOREIGN PATENTS 1,134,959    12/1956    France.

MILTON BUCHLER, *Primary Examiner.*

ARTHUR L. LA POINT, FERGUS S. MIDDLETON, *Examiners.*

G. E. A. HALVOSA, *Assistant Examiner.*